(12) United States Patent
Travers et al.

(10) Patent No.: US 12,556,419 B2
(45) Date of Patent: Feb. 17, 2026

(54) HANDS-FREE COMMUNICATION AND AUTOMATED BILLING SYSTEM AND METHOD

(71) Applicant: Vuzix Corporation, West Henrietta, NY (US)

(72) Inventors: Paul J. Travers, Honeoye Falls, NY (US); Robert W. Gray, Rochester, NY (US)

(73) Assignee: Vuzix Corporation

( * ) Notice: Subject to any disclaimer, the term of this patent is extended or adjusted under 35 U.S.C. 154(b) by 316 days.

(21) Appl. No.: 18/012,593

(22) PCT Filed: Jun. 24, 2021

(86) PCT No.: PCT/US2021/038920
§ 371 (c)(1),
(2) Date: Dec. 22, 2022

(87) PCT Pub. No.: WO2021/262995
PCT Pub. Date: Dec. 30, 2021

(65) Prior Publication Data
US 2023/0254169 A1 Aug. 10, 2023

Related U.S. Application Data

(60) Provisional application No. 63/042,459, filed on Jun. 22, 2020.

(51) Int. Cl.
*H04L 12/00* (2006.01)
*G02B 27/01* (2006.01)
(Continued)

(52) U.S. Cl.
CPC ............ *H04L 12/14* (2013.01); *G02B 27/017* (2013.01); *H04N 7/141* (2013.01); *G02B 2027/0178* (2013.01)

(58) Field of Classification Search
CPC .................. H04L 12/14; G02B 27/017; G02B 2027/0178; G02B 455/406; H04N 7/141
See application file for complete search history.

(56) References Cited

U.S. PATENT DOCUMENTS 7,340,045 B2   3/2008 Felger
7,805,127 B2   9/2010 Andreasen et al.
(Continued)

OTHER PUBLICATIONS

Huawei Technologies Co., Ltd. (2017) "Preparing for a Cloud and AR/VR Future," white paper, 25 pgs.
(Continued)

*Primary Examiner* — Khai M Nguyen
(74) *Attorney, Agent, or Firm* — Harter Secrest & Emery LLP; Jacob D. Merrill, Esq.

(57) ABSTRACT

A method of real-time communication, including providing a first electronic communications device in signal communication with a network, wherein the first electronic communications device includes a processing unit, and providing a second electronic communications device in signal communication with the network. Initiating a communications session between the first and second electronic communications devices, tracking a duration of the communications session, and ending the communications session between the first and second communications devices. Generating billing data as a function of the duration of the communication session and automatically transmitting the billing data to a billing agency.

20 Claims, 7 Drawing Sheets

(51) Int. Cl.
*H04L 12/14* (2006.01)
*H04N 7/14* (2006.01)

(56) References Cited

U.S. PATENT DOCUMENTS

| | | |
|---|---|---|
| 8,031,645 B2 | 10/2011 | Atarius et al. |
| 8,260,967 B2 | 9/2012 | Moore et al. |
| 8,849,680 B2 | 9/2014 | Wright et al. |
| 9,762,744 B2 | 9/2017 | Miida et al. |
| 9,838,645 B2 | 12/2017 | Hyde et al. |
| 9,843,771 B2 | 12/2017 | Shuster |
| 10,129,391 B2 * | 11/2018 | Murynets ............ H04M 3/2227 |
| 10,438,418 B2 | 10/2019 | Iwai et al. |
| 10,586,397 B1 | 3/2020 | Ha et al. |
| 10,805,403 B2 | 10/2020 | Elad et al. |
| 10,842,378 B2 | 11/2020 | Verma |
| 2006/0223512 A1 | 10/2006 | Runge et al. |
| 2008/0263458 A1 | 10/2008 | Altberg et al. |
| 2013/0263227 A1 * | 10/2013 | Gongaware ............. G06F 21/32 726/4 |
| 2014/0058807 A1 * | 2/2014 | Altberg .................. H04L 12/66 348/14.08 |
| 2015/0011184 A1 | 1/2015 | Sutaria et al. |
| 2015/0073907 A1 | 3/2015 | Purves et al. |
| 2015/0312533 A1 * | 10/2015 | Moharir ................. G16H 80/00 348/14.02 |
| 2017/0039774 A1 | 2/2017 | Estable |
| 2017/0169520 A1 | 6/2017 | Cornet |
| 2017/0255754 A1 | 9/2017 | Allen |
| 2020/0342963 A1 | 10/2020 | Mohammad |

OTHER PUBLICATIONS

United States Patent & Trademark Office (ISA/US), International Search Report and Written Opinion in PCT/US2021/038920, dated Oct. 4, 2021.

* cited by examiner

HANDS-FREE COMMUNICATION AND AUTOMATED BILLING SYSTEM AND METHOD

TECHNICAL FIELD

The present disclosure relates generally to systems operable to connect two or more persons (e.g., audio and/or video) and identifying communication session activity for billing services, and more particularly to tracking the duration of communication session connectivity, connecting to a billing service, and submitting billing information to the billing service.

BACKGROUND

With rapid advances in technology, manufacturers of mobile devices (e.g., head mounted displays, smart phones, etc.) are continually challenged to add greater functional capability in smaller form utilizing user interface features to achieve convenience of mobility. For instance, beyond the already advanced data capabilities of mobile devices, a mobile electronic device may need to connect two or more persons for audio communication and/or visual communication. Additionally, and ideally, the mobile device is functional hands-free, i.e., without the necessity of holding and/or otherwise manipulating the device with the user's hand or hands.

Head-Mounted Displays (HMDs) are being developed for a range of diverse uses, including military, commercial, industrial, fire-fighting, entertainment applications, and consultant services such as, but not limited to, doctor to doctor consultation, doctor to attendant consultation and guidance, real-time language translation between parties, technical expert(s) to maintenance personal, and the like. For many of these applications, there is particular value in providing a hands-free augmented reality communications device and software application systems allowing the participants in the communication session to utilize their hands for tasks other than communication while remaining in the communication session. In addition to enabling at least one communication session participant to provide a real-time visual feed from their perspective to the other participants of the communication session, there is a need for automatically classifying and submitting billing information concerning the communication session to a billing department and/or party, thus eliminating human intervention and potential for human error.

SUMMARY

The present disclosure provides for an augmented reality (AR) hardware and software system and method for communicating between two or more persons without the need to manipulate the communication hardware with the users' hands, and for secure and accurate billing of communication connectivity time and providing means to review communications at a later time.

In a first exemplary embodiment, a method of automating billing for the duration of a communication session comprising at least one hands-free smart glasses allowing the user to initial or join a communication session with one or more people located remotely, identifying user profiles, said profiles providing predefined parameters, e.g. billing institute, terminating the communication session with one or more users, automatically initiating billing for the time duration that the user was participating in the communication session.

In a second exemplary embodiment, a method of automating billing for the duration of a communication session comprising at least one hands-free smart glasses allowing the user to initial or join a communication session with one or more people located remotely, identifying user profiles, said profiles providing predefined parameters, e.g. billing institute and/or session recording archive institute, terminating the communication session with one or more users, automatically initiating billing for the time duration that the user was participating in the communication session, archiving a copy of the audio and/or video recorded during the communication session in a predefined archive for later retrieval.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1:
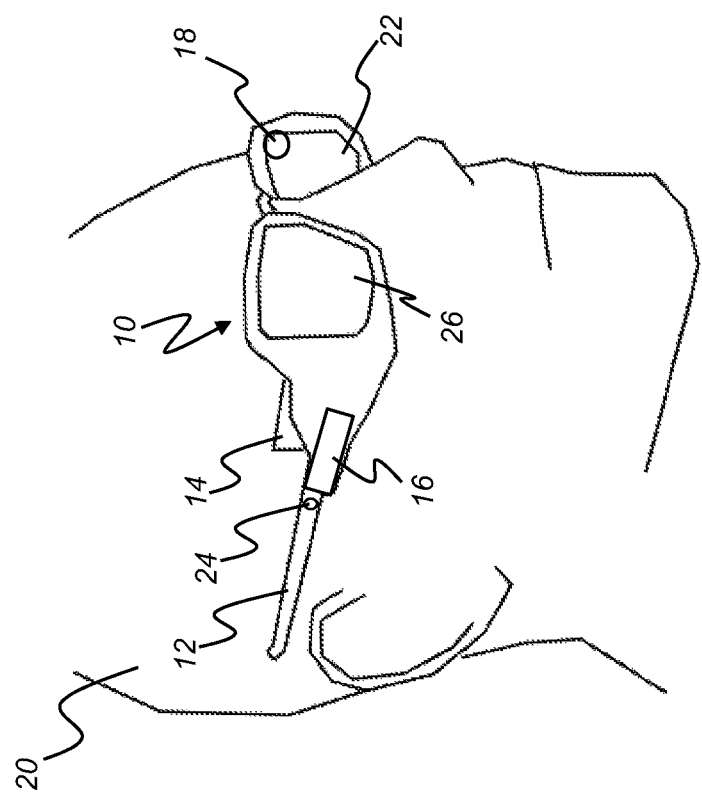
FIG. 1 shows an electronic device that may be utilized in an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", "person" and "user" are considered to be equivalent and refer to the person who wears and/or views images using an electronic device.

The term "handsfree smart glasses" as used here includes augmented reality smart glasses, virtual reality headsets, and other display devices that can be operated without touching the device with the user's hands. With such devices, commands to the device may be initiated by voice and/or hand gestures and/or other means.

An optical system such as a HMD is operable to form a virtual color image that can be visually superimposed over the real-world image that lies in the field of view of the HMD user (i.e., a virtual image display). A HMD may be monocular or binocular, and may be in the form of smart glasses. Smart glasses include computer processing ability together with sensors, e.g., microphones, accelerometers, cameras, and the like. Additional computer processing may be provided by connectivity to, e.g., a smart phone, either by communication wire or wirelessly, through Bluetooth or other wireless connectivity.

In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

HMD's do not typically have keyboard devices for input. However, HMD's may have a touch sensitive pad or area on the device for gesture input. Alternatively, a camera may be utilized for capturing input gestures, or a combination of camera and touchpad input may be utilized to capture input gestures. Utilizing one or more microphones allows for the ability to process voice commands from the wearer of the HMD. In this way, the HMD may be operated hands free. Additionally, with accelerometers attached to or built into the HMD, head gestures, tilts, tips, nods, etc. may be utilized to provide hands-free input to the command processor of the HMD.

For example, a nurse may utilize a HMD to communicate with a doctor, located remotely, about a patient's condition. The doctor may instruct the nurse to perform a procedure which the doctor may need to visually review while the procedure is being performed, such that the doctor may provide audio instructions to the nurse in real-time. Using an AR system comprising at least a portable hands-free AR headset, e.g., smart glasses, audio/visual communications, LAN/WAN connectivity, and automated billing software, the nurse-doctor consultation may be carried out remotely and the billing to the patient or patient's authorized payment agency, i.e., an insurance institution, may be recorded and submitted automatically by the software.

Software may include ability to record audio and/or visual communications of one or more communication devices participating in the communication session. Said records may be archived and/or transmitted with the billing data for later retrieval. For example, in billing disputes, the audio and/or visual recording may be recalled from the archive and reviewed by authorized institutions to ensure accurate billing assessments. Accuracy and accountability are therefore assured by automatic billing and filing of recorded communications sessions which eliminate human intervention and possible misuse.

The present disclosure provides for a convenient and secure method for communicating, recording, and accurately automating a billing system in which at least one communication devices allows hands-free usage, including initiation of communication session, visual adjustments (e.g., camera movement), termination of the communication session, billing, and archival of communication session data without utilization of the participants' hands.

As illustrated in FIG. 1, in an embodiment, an electronic device 10 comprises hands-free smart glasses. The electronic device 10 may include at least a right temple arm 12 and a processing unit 14 operable to store data and computer programs, and operable to execute the computer programs. Additionally, the processing unit 14 may be connected to a gesture input device 16. The gesture input device 16 is operable to convey gestures to processing unit 14. In an embodiment, the gesture input device 16 is a touchpad. Additionally, the electronic device 10 may comprise one or more microphones 24 for audio input to processing unit 14. The electronic device 10 may further comprise one or more cameras 18 connected to the processing unit 14.

Processing unit 14 is operable to record audio and video data via the one or more microphones 24 and/or cameras 18. Processing unit 14 is also operable to enable wireless communication. In one embodiment, wireless communication includes use of a Bluetooth chip in electrical communication with the processing unit 14. In one embodiment, wireless communication includes use of a WiFi chip in electrical communication with the processing unit 14. Electronic device 10 may also have sensors, including accelerometers operable for detecting tip and/or tilt motion of the user's head 20. Electronic device 10 also includes a display device operable to create and present virtual images to the user. For example, right eye cover 26 may be a see-through waveguide with diffractive optical elements suitable for providing virtual images. Left-eye cover 22 may be a see-through waveguide suitable for providing virtual images. In one embodiment, one of left-eye cover 22 or right eye cover 26 is a see-through waveguide, but not both. In one embodiment, electronic device 10 is a monocular augmented reality hands-free smart glasses device. In another embodiment electronic device 10 is a binocular augmented reality hands-free smart glasses device. In another embodiment, electronic device 10 is a HMD such that right and left eye-covers 26, 22 are not see-through components. For example, electronic device 10 is a virtual reality device.

Figure 2:
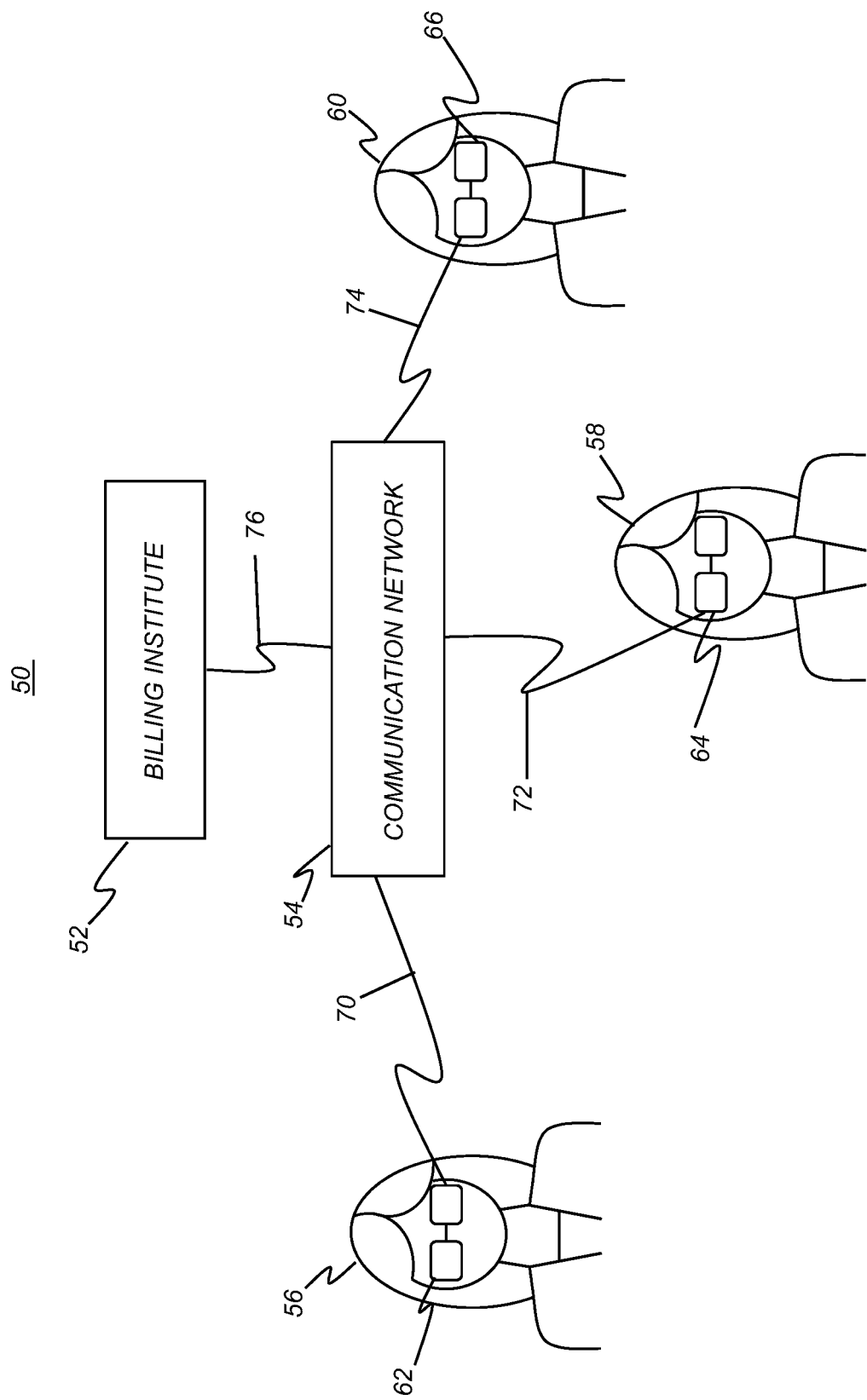
FIG. 2 shows components of communication session according to an embodiment of the present disclosure.

FIG. 2 is a schematic of one embodiment of the disclosed billing system 50. In this embodiment, the billing system 50 comprises at least a billing institute 52 that may be one of, but not limited to, an insurance company, a billing departing of a hospital, a billing department of a company, an authorized billing agency, or the like. Billing system 50 further includes a communications network 54 and two or more people 56, 58, 60. Each person 56, 58, 60 has an electronic device 62, 64, 66 suitable for operating in a hands free mode. In one embodiment, the electronic devices 62, 64, 66 are smart glasses as described in FIG. 1. Electronic devices 62, 64, 66 are connected to a communications network 54 via a wireless connection 70, 72, 74. In another embodiment, the electronic devices 62, 64, 66 are connected with the communications network 54 via one or more cable assemblies connected to a network hub.

The billing system 50 is in signal communication with the billing institute 52 via a connection 76 operable to communicate data/signals between the billing institute 52 and the communications network 54. The billing institute 52 may further include a recording archive operable to store and retrieve recorded communications during a communications session between said two or more people 56, 58, 60.

Figure 3:
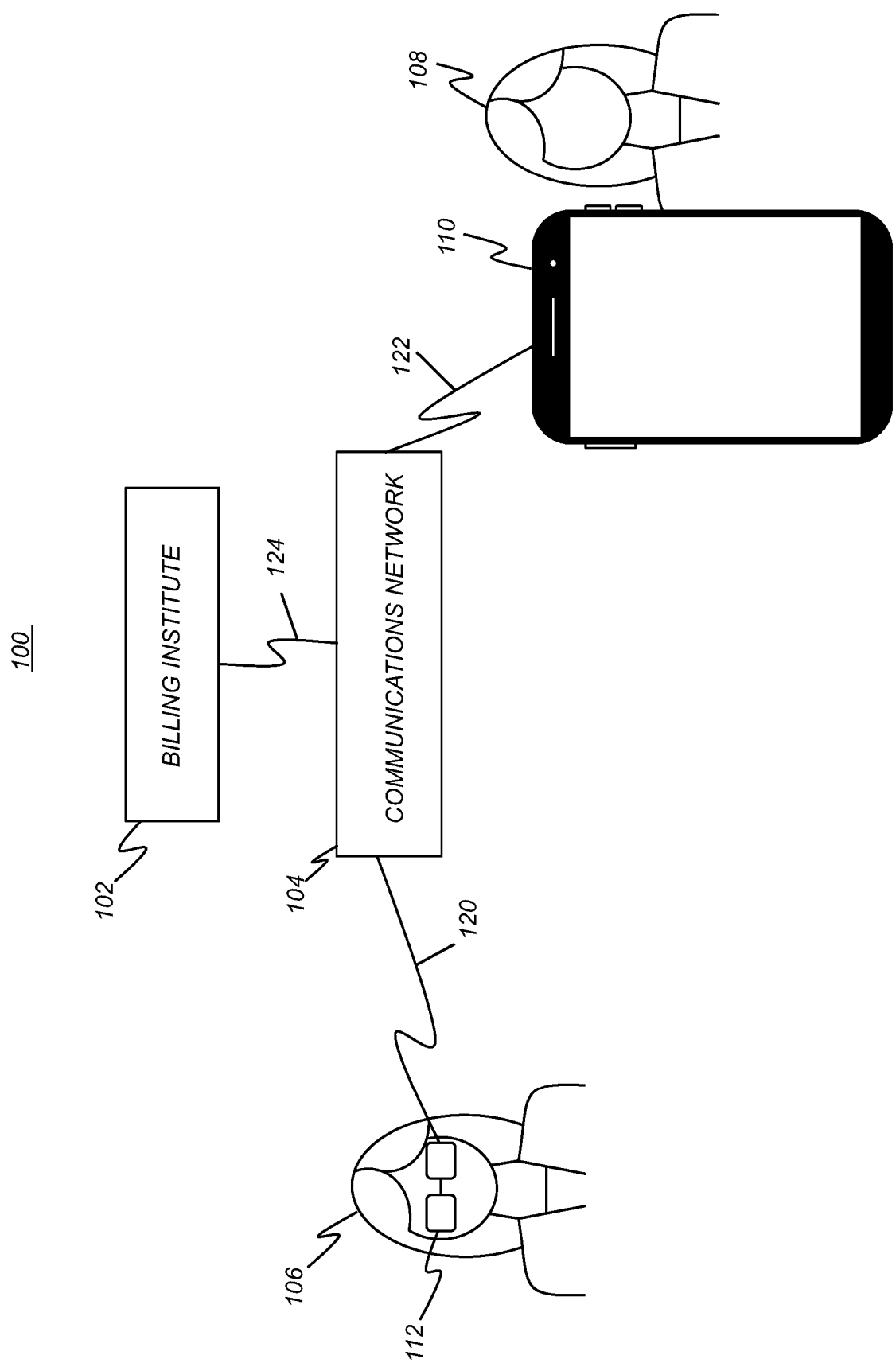
FIG. 3 shows components of communication session according to an embodiment of the present disclosure.

FIG. 3 is a schematic of one embodiment of the disclosed billing system 100. In this embodiment, billing system 100 comprises at least a billing institute 102 that may be one of, but is not limited to, an insurance company, a billing departing of a hospital, a billing department of a company, and an authorized billing agency. Billing system 100 further includes a communications network 104 and two or more people, 106, 108. Each person 106, 108, has an electronic device 112, 110 one of which is suitable for operating in a hands-free mode. Electronic device 110 may not be operable in a hands-free mode. In one embodiment, electronic device 112 is smart glasses as described in FIG. 1. In one embodiment, electronic device 110 is a smart phone. Electronic devices 112,110 have a wireless connection 120, 122 with the communications network 104. In another embodiment, the network communications means 120, 122 is cable assembly connected to a network hub. Communications network 104 is in signal/data connection 124 with the billing institute 102. Thus, the communications network 104 and the communications means 124, 120, 122 enable the establishment of a communication session between two or more people 106, 108 and billing institute 102 and enables data transfer to and from the people 106, 108 and the billing institute 102.

Figure 4:
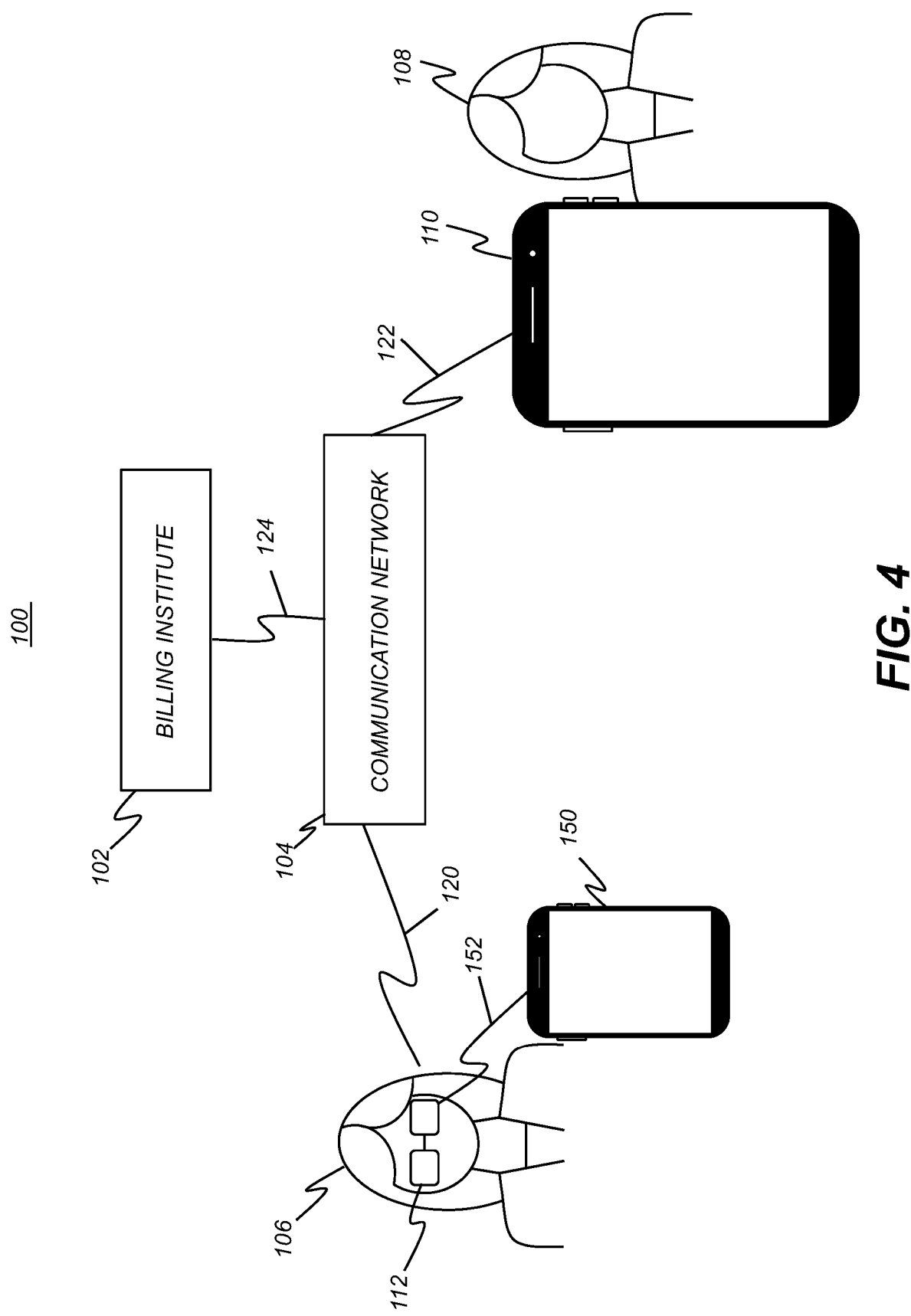
FIG. 4 shows components of communication session according to an embodiment of the present disclosure.

FIG. 4 is a schematic of one embodiment of the disclosed billing system 100. In this embodiment, billing system 100 further comprises an electronic device 150. In one embodiment, the electronic device 150 is a smart phone with operable to communicate with the electronic device 112. In one embodiment, the electronic device 150 communicates with electronic device 112 via a wireless communications connection 152. Wireless communications connection 152 may be, but is not limited to, a Bluetooth connection or a WiFi connection. In one embodiment, a wire or cable assembly is utilized in place of the wireless communications connection 152.

The electronic device 150 may be a portable or semi-portable computer. In an embodiment, the electronic device is a tablet computer. In another embodiment, the electronic device is a laptop computer. In another embodiment, the electronic device is a mobile workstation computer. In still another embodiment, the electronic device 150 is a desktop computer or other non-portable computing device.

Figure 5:
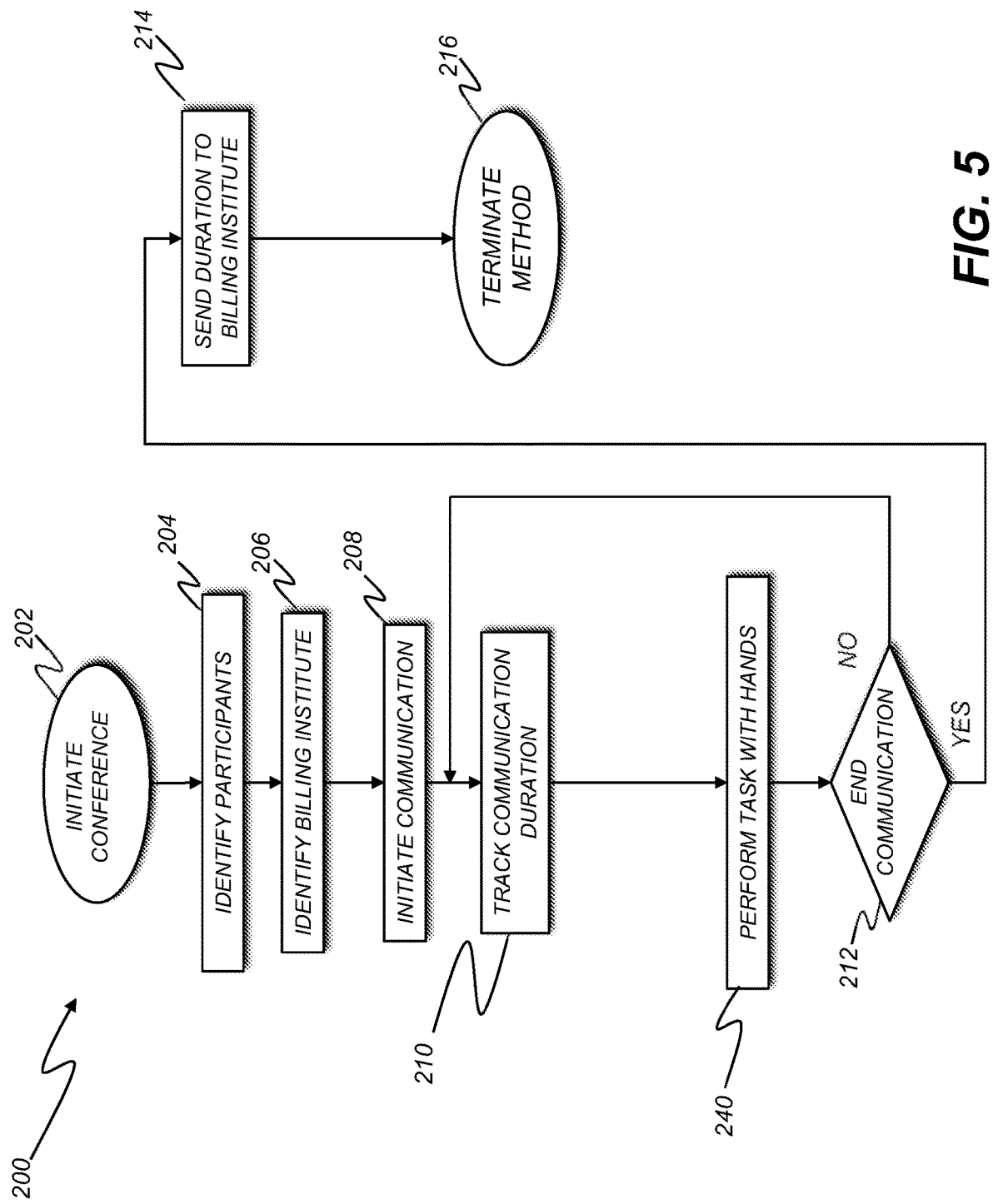
FIG. 5 is a flow chart of a method according to an embodiment of the present disclosure.

FIG. 5 is a flow chart of one embodiment of the method 200 disclosed herein. A person 56, 58, 60, 106, 108 (see FIGS. 2, 3, 4) who desires to communicate with one or more persons 56, 58, 60, 106, 108 initiates a communication session 202 utilizing the electronic device 150 with one or more 56, 58, 60, 106, 108 to initiate the method 200. The electronic device 150 then initiates software or a component of the software operable to identify 204 the individuals participating in the communication session. The billing information and institute associated with the identified participants of the communication session is next identified 206. In one embodiment, billing information and institute is associated with only one of the participants of the communications session. In one embodiment, billing information and billing institute is associated with a third party not directly participating in the communications session, e.g., a patient that is not directly linked into the communications session and/or a company/institution employing/contracting one or more of the participants. During the communication session, the patient may not directly provide audio and/or video communication, but sensors and/or instrumentation connected to—or otherwise monitoring—the patient may provide patient information (e.g., telemetry) to the people participating in the communication session and may be graphically presented to the participants via the display of their electronic device 150.

Identification of the individuals to participate 204 in communication session may include obtaining the individuals' profiles that may include a billing rate, recording preferences (e.g., to allow recording or not to allow recording), identification of recording archives (e.g., there may be one or more authorized archives to which a communication session is to be sent for data archiving and later retrieval), billing records institutions (where copies billing records are to be sent), and the like. Additionally, a billing rate may be predefined based on the number of participations in a communication session, who the individual is communicating with, e.g., a doctor communicating with another doctor versus a doctor communicating with a nurse or a doctor communicating with patient, and the like.

In one embodiment, identification of the individuals to participate 204 includes the identification of a third party not necessarily directly connected to the communication session. For example, a patient may be the subject of the communication session between multiple caregivers while not directly involved in the communication session. Scanning of a patient identification, e.g., a wrist id band, a bar code on a patient's records folder, or other identification means, may be used to include the patient's profile and indicate billing institution, and other information, e.g., medical records and the like.

With continued reference to FIG. 5, communication between all participants is initiated 208 and communication of audio, video, and/or data (e.g., numerical data and/or data presented as a chart or graph) begins. A time duration tracker 210 is initiated which keeps track of the time each participant is connected to the communication session. Additionally, the amount of data transmitted from or received by each participant may be tracked. Data may be audio data, video data, other image data, numerical data, chart data, graph data, data from patient monitoring devices, data from machine sensors, and the like. While the communication session is in process, persons with hands-free devices may optionally intermittently or consistently perform a task 240 involving the person's hand or hands.

Data utilized during a communication session may have a separate billing rate and/or may be communicated to a second authorized billing institute. In one embodiment, the data from a heart monitoring machine may be transmitted to one or more participants of the communication session, and billed at a predefined billing rate that is different from data from a patient temperature monitoring device. Thus, the kind of data accessed and/or distributed to one or more participants may be billed at a different rate. In another embodiment, the data accessed and/or distributed to one or more participants in the communication session may be utilized by the software of the electronic device 150 as a marker for the billing rate associated with one or more participants.

With continued reference to FIG. 5, if communication between participants ends 212 a billing notification is sent to the one or more authorized billing institutes in step 214 and the method terminates 216.

Figure 6:
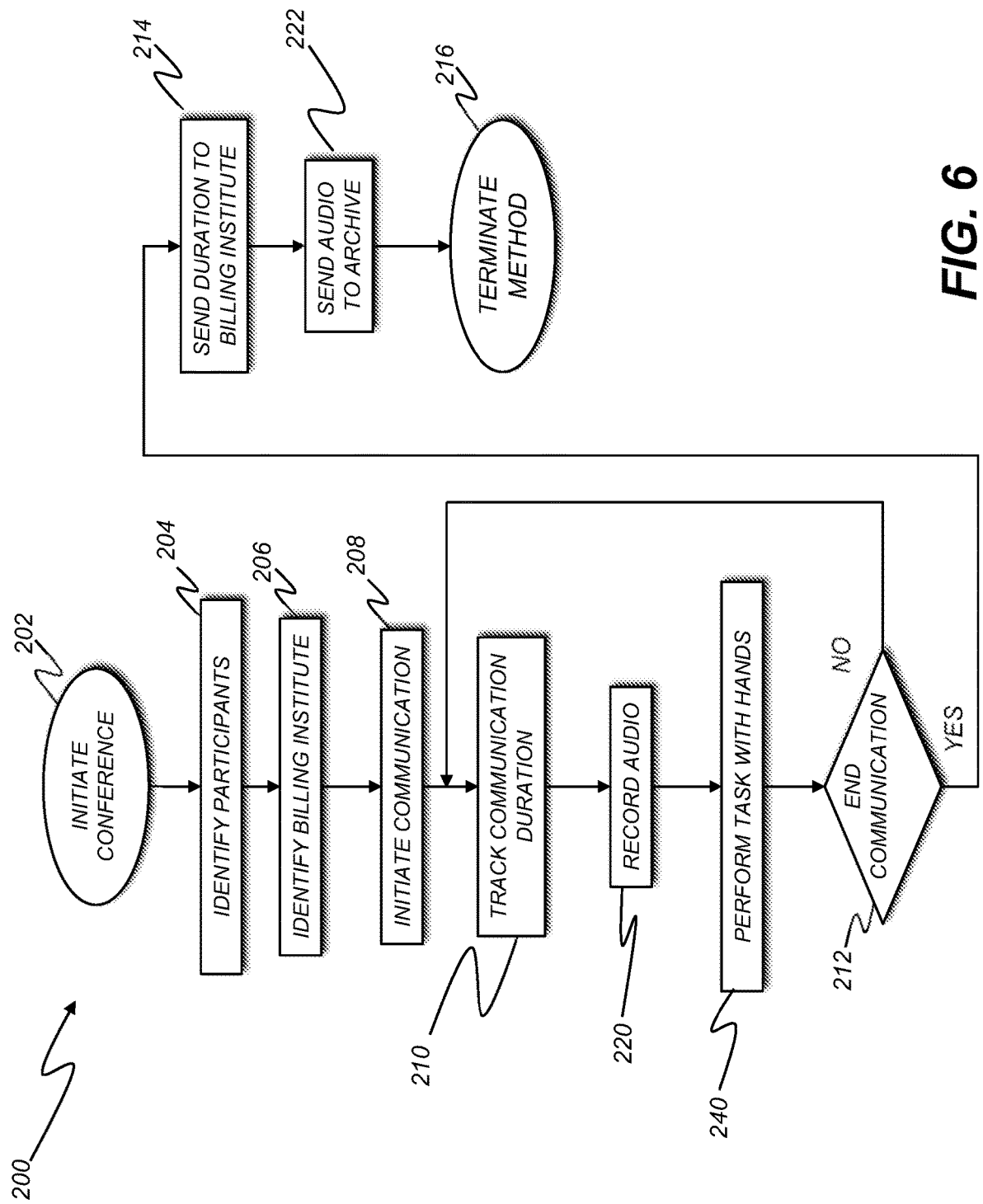
FIG. 6 is a flow chart of a method according to an embodiment of the present disclosure.

FIG. 6 is a flow chart of one embodiment of the method 200 further disclosing the additional step of recording the audio portion 220 of the communication session. After, or generally simultaneous to, the step of sending the billing to the one or more authorized billing institutes 214, the audio recording is sent to an authorized archive 222 such that the audio recording may be accessed at a later time. In one embodiment, the institute hosting the authorized audio archive is the same as the billing institute. In another embodiment, the institute hosting the authorized audio archive is different from the billing institute. In one embodiment, one or more of the communication session participants has an authorized archive to which a copy of the audio recording may be archived.

Figure 7:
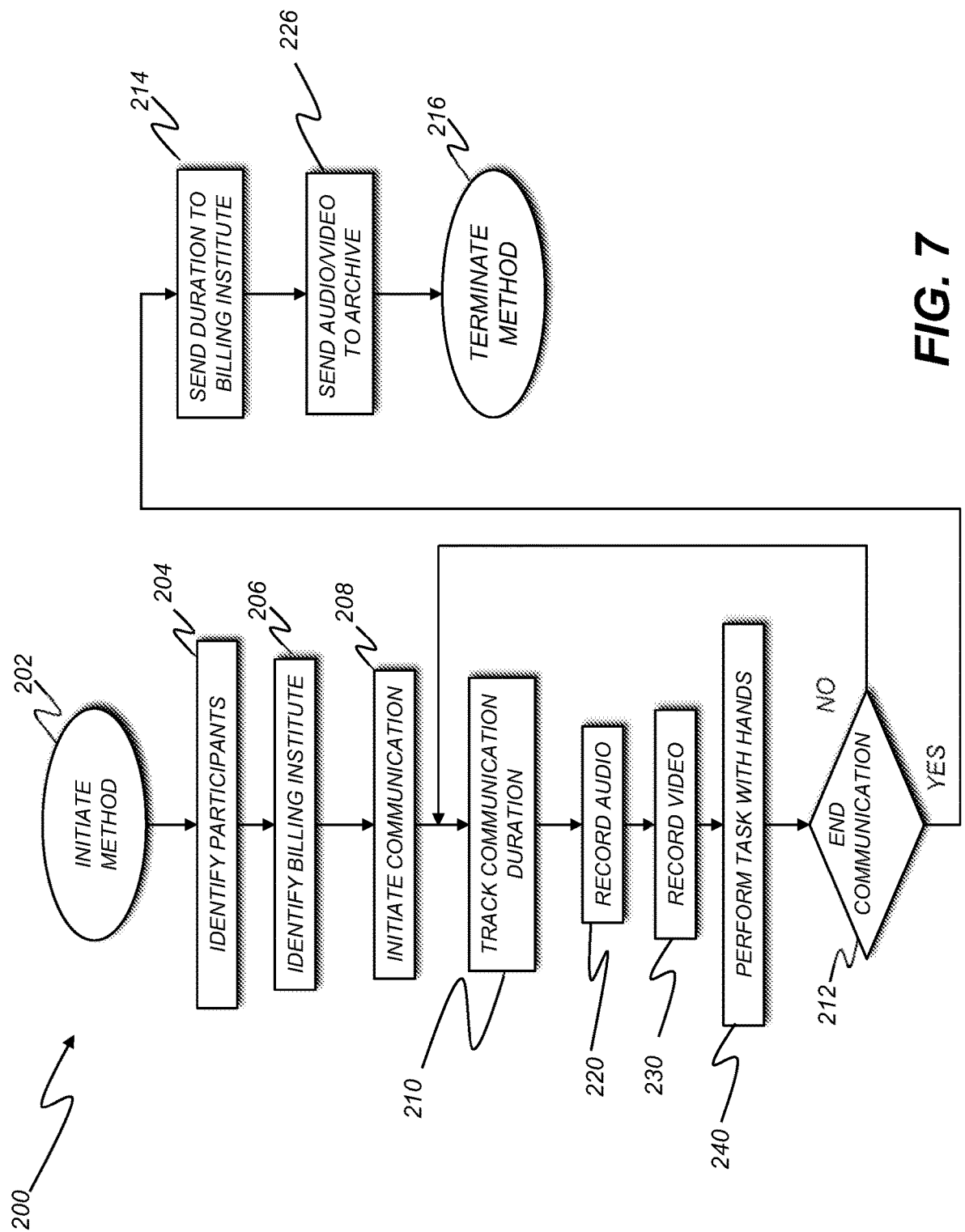
FIG. 7 is a flow chart of a method according to an embodiment of the present disclosure.

FIG. 7 is a flow chart of one embodiment of the method 200 further disclosing the additional step of recording video portions 230 of one or more participants of the communication session. After the step of sending the billing data to the one or more authorized billing institutes 214, the audio and/or video recordings are sent to an authorized archive 226 such that the audio and/or video recording(s) may be accessed at a later time. In one embodiment, the institute hosting the authorized archive is the same as the billing institute. In another embodiment the institute hosting the authorized archive is different from the billing institute. In one embodiment, one or more of the communication session participants has an authorized archive to which a copy of the communication session recording may be archived.

In another embodiment of the method 200, in addition to and/or instead of audio and video being recorded additional data may be recorded. Additional data may be patient data from medical records databases, data from devices monitoring the patient, or other data. The additional data may be archived with and/or instead of the audio and video data.

In one embodiment, the step 214 sending the billing data to the one or more authorized institutes may send the billing data to multiple additional institutions/departments for record keeping and tracking. In one embodiment, a billing statement may be divided into different portions whereby each portion of the total bill is sent to different authorized billing institutes.

It is to be understood that some steps may be taken in a different order than listed in the flow charts. In one embodiment, the billing step 214 occurs after the archiving step 226. In one embodiment, the billing step 214 and archiving step 226 are combined into a single data transmission step.

In one embodiment, the billing rate is based on a quality factor. For example, the billing rate for a nurse participating in the communication session may be different from the billing rate of a specialist and/or doctor's billing rate. Additionally and/or alternatively, a billing rate may be based on the topic of the communication session. In one embodiment, an artificial intelligence system is utilized as part of the communication system to determine the topic or topics of the communication session, each different topic having a different billing rate. In one embodiment, the artificial intelligence is utilized after the communication session concludes utilizing the archived data recording of the communication session to determine the topics discussed and to apply billing rates based on the topics. In this way, the billing rate may be, in part or in whole, based on what is being communicated.

In one embodiment, the equipment utilized during the communication session is identified and tracked and added to the billing statement. For example, a medical procedure may be performed during the communication session, such as injecting a patient with a drug. The hands-free smart glasses are operable, e.g., via a video/camera system, a bar code scanner, and/or radio-frequency identification (RFID) reader, etc., to identify the medical equipment and/or materials utilized during a communications session and add an associated fee to the billing statement. For example, the smart glasses may identify, but is not limited to, the pharmaceuticals/chemicals in a vial, a syringe being used, a disinfectant swab utilized to disinfect the injection site, and surgical tools. In another example, equipment maintenance personnel utilizing hands-free smart glasses may be in communication with a specialist, instructor, or field technician familiar with the equipment being serviced. The maintenance person may be instructed, through the use of the communication session, to replace a filter of the equipment. The hands-free smart glasses are operable, e.g., via one or more cameras, a barcode scanning system, a verbal/audio identification system, and/or radio-frequency identification (RFID) reader, and the like, to identify the filter being inserted into the equipment. After identification of the filter used in the equipment maintenance, an associated fee is added to the billing statement. Identification of the equipment used during the communications session may be recognized by an artificial intelligence system during or after the communications session.

Billing may also be based on equipment connectivity during the communications session and/or the machines/equipment utilized during the communications session.

Scanning the patient's wrist band for ID, scanning a bar code on a medical record, and/or scanning a patient's face and utilizing facial recognition software for patient identification may be utilized together, or separately, with other input (e.g., voice commands of a hands-free smart glasses) to begin the communications session method and billing.

One or more features of the embodiments described herein may be combined to create additional embodiments which are not depicted and/or described. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A method of real-time communication, comprising:
providing a first electronic communications device in signal communication with a network, wherein said first electronic communications device comprises a processing unit;
providing a second electronic communications device in signal communication with said network;
initiating a communications session between said first and second electronic communications devices, wherein said communications session comprises audio and video communications, wherein said first and second electronic communications devices are each operable to transmit and receive information;
identifying participants of said communications session via at least one of said first and second electronic communications devices;
tracking a duration of said communications session via at least one of said first and second electronic communications devices;
ending said communications session between said first and second communications devices;

generating billing data as a function of a billing rate of at least one of said participants of said communications session and said duration of said communications session via at least one of said first and second electronic communications devices; and automatically transmitting said billing data to a billing agency.

2. The method of real-time communication according to claim 1, wherein said first electronic communications device is operable as a hands-free communications device.

3. The method of real-time communication according to claim 1, wherein said first electronic communications device is an augmented reality smart glasses device comprising a microphone and a camera in signal communication with said processing unit.

4. The method of real-time communication according to claim 1, wherein said method further comprises recording audio and video communications data between said first and second electronic communications devices.

5. The method of real-time communication according to claim 4, wherein said recorded audio and video communications are transmitted to a remote archive, wherein said recorded audio and video communications are operable to be retrieved by said billing agency.

6. The method of real-time communication according to claim 5, wherein said billing agency is a patient's insurance agency.

7. The method of real-time communication according to claim 5, wherein said recorded audio and video communications are archived at two or more locations.

8. The method of real-time communication according to claim 7, wherein said recorded audio and video communications are stored at said remote archive and said first electronic communications device.

9. The method of real-time communication according to claim 4, wherein said recording is archived at an authorized third party archive, wherein said first and second electronic communications devices are not operable to access said recording.

10. The method of real-time communication according to claim 1, wherein said billing agency is identified during said communication session, and wherein said billing data is transmitted to said billing agency at said ending of said communication session.

11. The method of real-time communication according to claim 1, wherein said billing agency is identified upon initiating said communication session, and wherein said billing data is transmitted to said billing agency continuously or at intervals during said communication session.

12. The method of real-time communication according to claim 1, wherein three or more electronic communications devices are connected during said communication session.

13. A method of real-time communication, comprising:

providing a first electronic communications device in signal communication with a network, wherein said first electronic communications device comprises a processing unit;

providing a second electronic communications device in signal communication with said network;

identifying a patient via at least one of an identification number, a barcode, and facial recognition software via at least one of said first and second electronic communications devices;

initiating a communications session between said first and second electronic communications devices;

displaying telemetry of said patient via at least one of said first and second electronic communications devices;

ending said communications session between said first and second electronic communications devices;

generating billing data as a function of a duration of said communications session via at least one of said first and second electronic communications devices; and automatically transmitting said billing data to a billing agency.

14. The method of billing communication according to claim 13, wherein said billing data is generated as a function of patient data communication during said communication session.

15. The method of billing communication according to claim 13, wherein said billing agency is an insurance agency associated with said patient.

16. A method of billing communication, comprising:

providing a first electronic communications device in signal communication with a network, wherein said first electronic communications device comprises a processing unit;

providing a second electronic communications device in signal communication with said network;

initiating a communications session between said first and second electronic communications devices, wherein said first and second electronic communications devices are each operable to transmit and receive information;

identifying at least one of materials and equipment utilized during said communications session via at least one of said first and second electronic communications devices;

ending said communications session between said first and second electronic communications devices;

generating billing data as a function of at least one of said materials and said equipment utilized during said communications session; and automatically transmitting said billing data to a billing agency via at least one of said first and second electronic communications devices.

17. The method of billing communication according to claim 16, further comprising tracking a duration of said communications session, and generating billing data as a function of said duration of said communications session.

18. The method of billing communication according to claim 16, further comprising identifying participants of said communications session, and generating billing data as a function of a billing rate of at least one of said participants of said communications session.

19. The method of billing communication according to claim 16, wherein said first electronic communications device comprises a barcode scanning system operable to identify at least one of said materials and said equipment utilized during said communications session.

20. The method of billing communication according to claim 16, wherein said first electronic communications device comprises a radio-frequency identification reader operable to identify at least one of said materials and said equipment utilized during said communications session.

* * * * *